United States Patent [19]

Geisow

[11] 4,444,224
[45] Apr. 24, 1984

[54] MECHANIZED ORIFICE FITTING

[75] Inventor: Bernard H. Geisow, Houston, Tex.

[73] Assignee: Daniel Industries, Inc., Houston, Tex.

[21] Appl. No.: 396,419

[22] Filed: Jul. 8, 1982

[51] Int. Cl.³ ............................................... F16D 1/00
[52] U.S. Cl. ................................................... 138/44
[58] Field of Search .................. 138/44, 45, 94.3, 94.5

[56] References Cited

U.S. PATENT DOCUMENTS

1,168,490 1/1916 Duncan ................................. 138/45
1,938,458 12/1933 McFarlane ............................ 138/44

Primary Examiner—John W. Shepperd
Attorney, Agent, or Firm—Gunn, Lee & Jackson

[57] ABSTRACT

A mechanized orifice fitting mechanism is provided having a body structure forming an internal chamber and an access opening that is closed by means of a quick disconnect closure. Internally of the body is provided a cam actuated orifice plate ejector and sealing plate which is movable to control positioning of a removable orifice plate in relation to a flow passage extending through the body. Mechanically energized sealing elements are adapted to seal either the orifice plate or the ejector plate and thus permit depressurization of the body to permit insertion and removal of the orifice plate without depressurizing the flow line to which the mechanized orifice fitting is connected.

32 Claims, 9 Drawing Figures

MECHANIZED ORIFICE FITTING

FIELD OF THE INVENTION

This invention relates generally to orifice fittings for measuring the flow of fluids in pressurized pipelines. More specifically, the invention relates to a mechanized orifice fitting mechanism wherein simplified orifice plates may be installed into the orifice fitting or removed therefrom without requiring depressurization of the pipeline to which the orifice fitting is connected. The invention also relates to an orifice fitting mechanism that may be operated through manual or power rotation of a single actuator shaft.

BACKGROUND OF THE INVENTION

Orifice fitting mechanisms are useful in measuring the flow of fluid products, particularly gaseous materials such as natural gas in pipelines. The fluid flows across a restricted orifice placed in the pipeline and develops a pressure differential existing across the orifice which is detected and utilized in conjunction with other factors such as pressure, type of fluid, temperature, etc., in order to arrive at a measurement representing the volume of the flowing fluid. This basic principle of flow measurement has been well known for an extended period of time.

In order to provide an orifice fitting mechanism having the capability of removing and installing an orifice plate without shutting down the flow line, an initial orifice fitting development was made by Mr. Paul P. Daniel, resulting in U.S. Pat. No. 1,965,826. Another Daniel U.S. Pat. No. 1,996,192 also discloses an orifice fitting mechanism of this general nature. Further, a more up-to-date orifice fitting design is exemplified by U.S. Pat. Nos. 2,688,987 of Whalen, and 4,286,364 of Connolly.

In the orifice fitting mechanisms set forth above, the orifice plate is mounted in a generally rectangular framework and this framework is moved linearly within the orifice fitting between a body chamber intersecting the flow passages and an access chamber which is typically defined by a body extension. A valve mechanism is located between the body chamber and access chamber and is capable of establishing a seal therebetween in order that the access chamber may be depressurized and opened without depressurizing the flow line. With the body chamber seal in place, the access chamber is depressurized in order to allow removal of an orifice plate from the framework and installation of a replacement orifice plate therein.

Typically, several external operating handles are employed which drive internal gears that function in concert to shift the orifice plate framework between the body chamber and the access chamber. Of course, this is accomplished with the body chamber valve in its open condition and with the access chamber in its closed and sealed condition. Since the orifice plate framework is encapsulated either within the body chamber or access chamber during manipulation of the framework, it is frequently difficult for service personnel to determine its proper location and to manipulate the multiple external handles so as to accomplish positioning of the framework within the body chamber for use and within the access chamber for installation and removal of the orifice plate. It is desirable therefore to provide an orifice plate mechanism having the capability of achieving proper positioning of the orifice plate through manipulation of a single orifice plate actuator. It is also desirable to provide an orifice plate mechanism wherein simple orifice plates may be utilized efficiently without the requirement to provide expensive frameworks within which the orifice plate is secured for use.

SUMMARY OF THE INVENTION

It is therefore a principal feature of the present invention to provide a novel orifice plate mechanism that facilitates installation and removal of orifice plates without requiring depressurization of the line to which the orifice plate mechanism is connected.

It is also a feature of this invention to provide a novel orifice plate mechanism which may be efficiently manipulated through manual or powered actuation of a single actuator shaft.

It is an even further feature of this invention to provide a novel orifice plate mechanism incorporating means for establishing a seal between a body chamber and an access chamber of the orifice plate mechanism, which sealing mechanism is actuated in sequential manner with an orifice plate positioning mechanism responsive to actuation by means of a single actuator shaft.

It is an even further feature of this invention to provide a novel orifice plate mechanism which employs simplified orifice plates which may be inserted into or removed from an orifice plate mechanism without any requirement for a framework to support and/or to accomplish positioning of the same.

Briefly, this invention relates to an orifice fitting mechanism incorporating a body structure defining inlet and outlet flow passages which are of straight through nature, such as to permit the passage of pigs, scrapers and other such line traversing devices. The flow passages are defined by conduits which extend to the central portion of the body structure. The inner extremities of the conduits are positioned in spaced relation so as to define a slot or receptacle therebetween within which an orifice plate or a plate ejector may be received. The inner extremities of the conduits are oppositely threaded and receive oppositely threaded seat elements. Upon rotation of the seat elements in the same direction, the seat elements are driven toward one another or away from one another depending upon the direction of rotation. The seat elements are capable of being driven toward one another and into sealing relation with an orifice plate or the plate ejector, depending upon selective actuation of the orifice plate mechanism. In each case the seat elements are capable of sealing the tubular flow passage with respect to the internal body chamber of the orifice fitting thereby permitting the body chamber to be depressurized without requiring depressurization of the flow line.

The body structure of the orifice fitting is also formed to define an access passageway which terminates in an access opening that is capable of being sealed by means of a quick disconnect type closure apparatus. Plate orienting means is provided within the access passageway in order to orient an orifice plate for internal positioning in registry with the orifice plate receptacle and seat elements.

An actuator mechanism is provided which permits controlled selective positioning of the orifice plate, orifice plate ejector and seat elements responsive to controlled rotation of a single actuator handle. A cooperative gear and cam arrangement is provided for the actuator mechanism which permits an orifice plate insertion sequence including insertion of an orifice plate into the access passageway followed by closure of the access opening. The seat elements are then retracted from sealing engagement with an ejector plate and the ejector plate is moved to a position allowing the orifice plate to descend to properly oriented relation with the seat elements. Thereafter, the seat elements are driven from their retracted position to a position establishing sealing engagement with the orifice plate. The actuator mechanism permits an orifice plate ejection sequence wherein the seat elements are initially driven toward the retracted position thereof, releasing sealing engagement with the orifice plate. Thereafter, the orifice plate ejector is moved to a position where a plate portion thereof shifts the orifice plate into the access passageway and a plate portion of the orifice plate ejector moves to a position between the sealing elements. Thereafter, the sealing elements are drive toward one another into sealing engagement with the plate portion of the ejector. Thereafter, the body chamber of the orifice fitting may be depressurized, the quick disconnect closure removed, thereby exposing the orifice plate in the insertion passageway, the orifice is simply removed from the passageway and a replacement plate is inserted into the plate guides of the insertion passageway. The closure mechanism is then replaced to seal the access opening and thus seal the body chamber. Thereafter, the seat elements may be retracted to then initiate the plate insertion procedure.

The orifice plate ejector is driven by means of a gear actuated cam which reacts against a cam roller on the orifice plate ejector. The gear of the cam is driven by a worm gear provided on a single actuator shaft. The actuator shaft extends from the orifice plate structure and is provided with an operating handle for manual operation or a power actuator for mechanically, electrically or hydraulically controlled operation. The worm gear also drives a crank mechanism which in turn drives a rack and pinion gear system which, through an appropriate straddle gear train, induces rotary movement to the seat elements to cause simultaneous opening and closing movement thereof. The straddle gear train is so oriented as to permit the orifice plate ejector to press through a space between the straddle gears. Thus, through operation of a single actuator shaft, the seat elements are selectively opened or closed and the orifice plate ejector is operated to cause either ejecting or insertion movement of an orifice plate in relation to the orifice plate receptacle.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiment thereof which is illustrated in the appended drawings, which drawings form a part of this specification.

It is to be noted, however, that the appended drawings illustrate only a typical embodiment of this invention and are therefore not be considered limiting of its scope, for the invention may admit to other equally effective embodiments.

IN THE DRAWINGS

DETAILED DESCRIPTION OF PREFERRED EMBODIMENT

Figure 1:
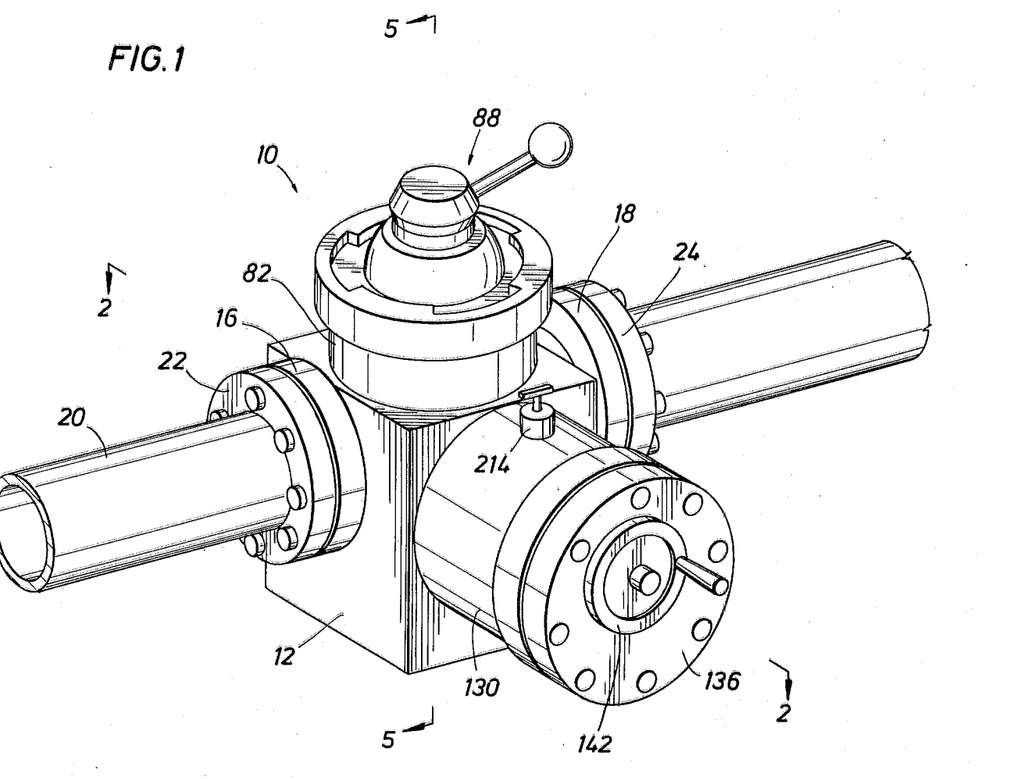
FIG. 1 is an isometric view of an orifice fitting mechanism constructed in accordance with the present invention and representing the preferred embodiment of the invention.
Figure 2:
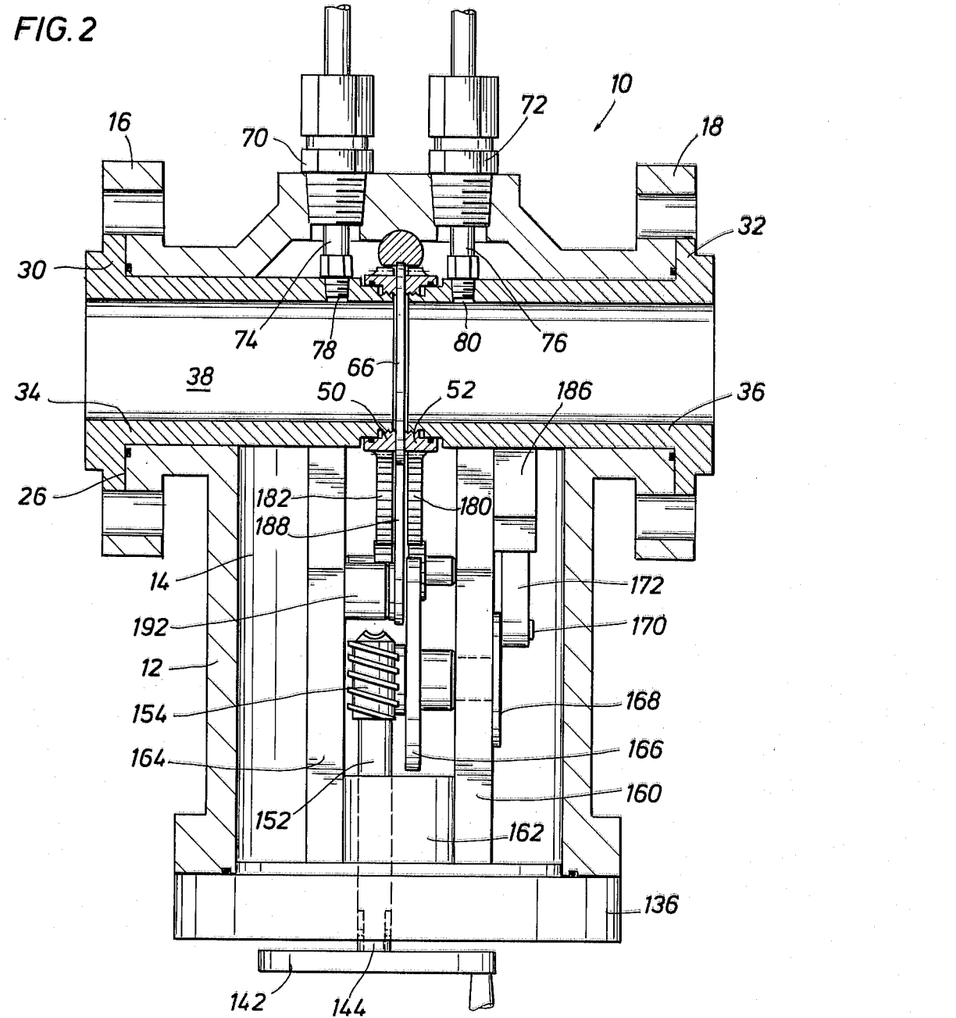
FIG. 2 is a sectional view of the orifice fitting mechanism taken along line 2—2 of FIG. 1, and being a horizontal section viewed in plan.

Referring now the drawings and first to FIG. 1, an orifice fitting mechanism is illustrated generally at 10 which comprises a body structure 12 which defines an internal body chamber 14. The body structure 12 is formed to define a pair of connection flanges 16 and 18 which permit bolted connection of the body structure to flanges of a pipeline 20 such as shown at 22 and 24. As shown in FIG. 2, the flanges 16 and 18 are formed to define circular recesses 26 and 28 which are adapted respectively to receive the flange portions 30 and 32 of internal conduit members 34 and 36. The conduit members 34 and 36 are located in coextensive registering relation and cooperate to define a flow passage 38 which extends through the orifice fitting. The flow passage is of straight through form, thus, in absence of an orifice plate, permitting passage of pigs, scrapers and other devices that are passed through the pipeline for the purpose of cleaning, product separation, etc.

Figure 3:
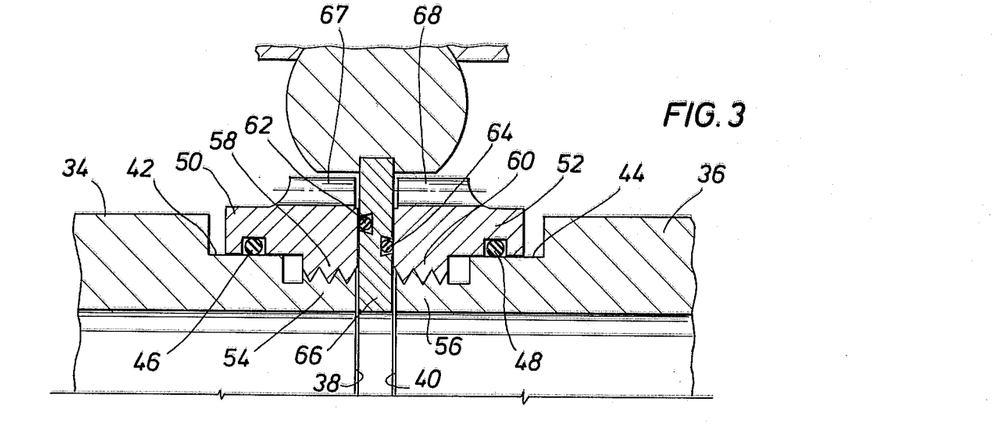
FIG. 3 is a fragmentary sectional view of the orifice fitting mechanism of FIG. 2, illustrating an orifice plate positioned relative to the movable seat members and orifice plate guide, and with the seat members being shown in the closed or sealed position thereof.
Figure 4:
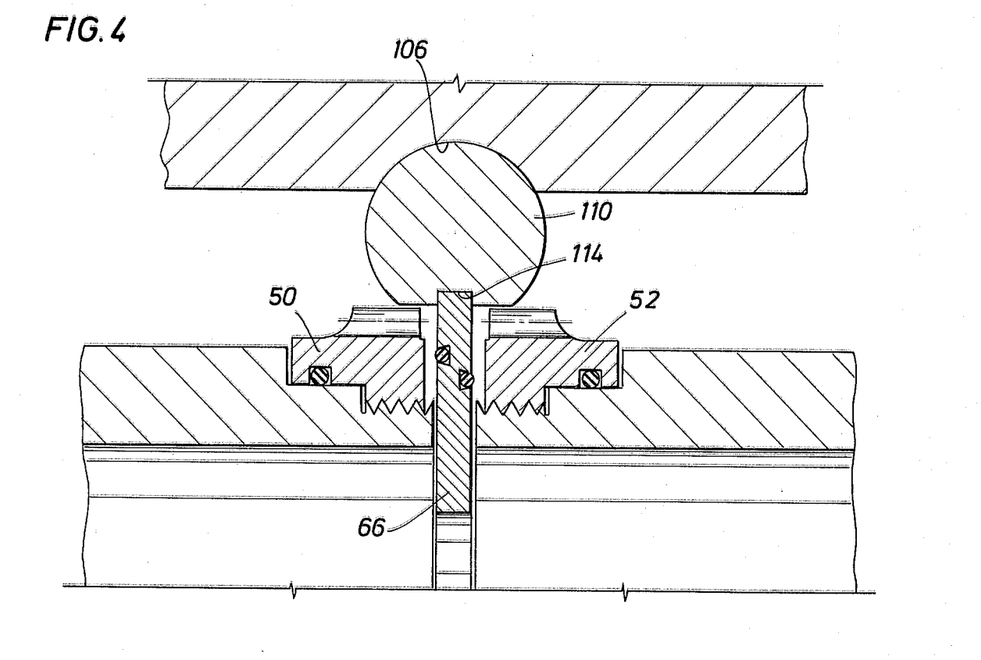
FIG. 4 is a fragmentary sectional view similar to that of FIG. 3 and illustrating the seat members in the retracted positions thereof.

As shown in the enlarged view of FIG. 3, the conduit members 34 and 36 are positioned with the extremities 38 and 40 thereof in spaced relation, the space therebetween defining an orifice plate receptacle. The inner extremities of each of the conduit members are also formed to define cylindrical sealing surfaces 42 and 44 which are engaged by circular internal seal elements 46 and 48 that are provided at the inner peripheries of a pair of movable seat elements 50 and 52. The conduit members each define externally threaded portions 54 and 56, one of which defines a right hand thread while the opposite one defines a left hand thread. The seat elements 50 and 52 each define internally threaded portions 58 and 60, one being right handed and the opposite one being left handed to thus engage the right and left handed threads of conduit portions 54 and 56. Arrangement of the right and left handed threaded portions of seat elements 50 and 52 is such that simultaneous rotation of the seat elements in one direction causes them to be drive toward one another, while simultaneous rotation of the seat elements in the opposite direction causes them to be driven away from one another. The seat elements 50 and 52 define opposed circular planar sealing surfaces which are adapted to move into sealing engagement with circular seal rings 62 and 64 which are carried within grooves of an orifice plate 66. The seat elements 50 and 52 are formed to define gear teeth 66 and 68 at the outer peripheries thereof. The gear teeth are engaged by the teeth of a pair of dual gears that are part of a straddle gear train to be discussed hereinbelow and which are adapted to accomplish simultaneous rotation of the seat elements for moving them to the respective sealed or retracted positions thereof. FIG. 3 shows the sealed positions of the seat elements 50 and 52 while FIG. 4 shows the seat elements being moved to the retracted positions thereof.

As shown in FIG. 2, a pair of pressure detection fittings 70 and 72 are connected to the body structure 12 and have internal portions 74 and 76 which are connected to the conduits 34 and 36 and which open into the flow passage 38 at openings 78 and 80 which are located on opposite sides of the orifice plate 66. As the presurized fluid medium flows through the passageway 38 and across the aperture of the orifice plate, a differential pressure is developed. By detecting the pressure upstream and downstream of the orifice plate by suitable means in communication with the orifice fittings, a pressure differential will be detected. This detected pressure differential will be utilized in computing the volume of fluid flowing through the flow passage.

It is desired to permit efficient insertion and removal of orifice plates relative to the orifice fitting. In accordance with the present invention, this feature is facilitated by providing the body structure with an access extension 82. The access extension 82 is formed internally to define an access passageway 84 which is in communication with the body chamber 14 at its lower extremity and defines an access opening 86 at the upper extremity. The access opening 86 is closed by means of a bayonnet type quick disconnect closure assembly shown generally at 88. The closure assembly 88 incorporates an outer bayonnet member 90 having flange portions 92 which are receivable within an internal bayonnet groove 94. The closure assembly also includes an internal pressure closure 96 having an annular sealing flange portion 98 that seats against an internal shoulder 100 defined within the access extension. The flange 98 also establishes a seal with an annular sealing member 102 which is suitably retained within an annular groove formed in the internal shoulder structure 100.

Figure 9:
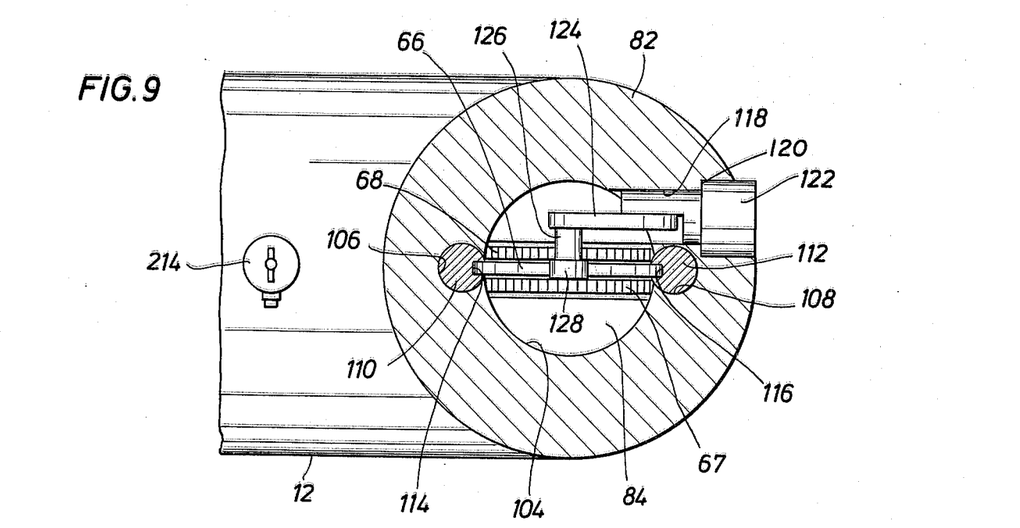
FIG. 9 is a sectional view taken along line 9—9 of FIG. 5 and illustrating the orifice plate guide elements and plate positioning element in the positions thereof illustrated in FIG. 5.

The access extension 82 is of generally tubular form and may define an internal generally cylindrical surface 104 forming the access passageway 84. As shown in FIG. 9, the cylindrical surface 104 may be of smaller diameter as compared to the diameter of the orifice plate 66. The access extension 82 is formed internally to define partial bores 106 and 108 which are oriented in such a manner that they intersect the cylindrical surface 104 along the length thereof. A pair of elongated guide bars 110 and 112 are positioned within the partial bores and are oriented with elongated guide grooves 114 and 116 thereof oriented in parallel relation and exposed to the access passageway 84. The orifice plate 66 is received within the guide grooves 114 and 116 in the manner shown in FIGS. 6, 7 and 9.

Figure 6:
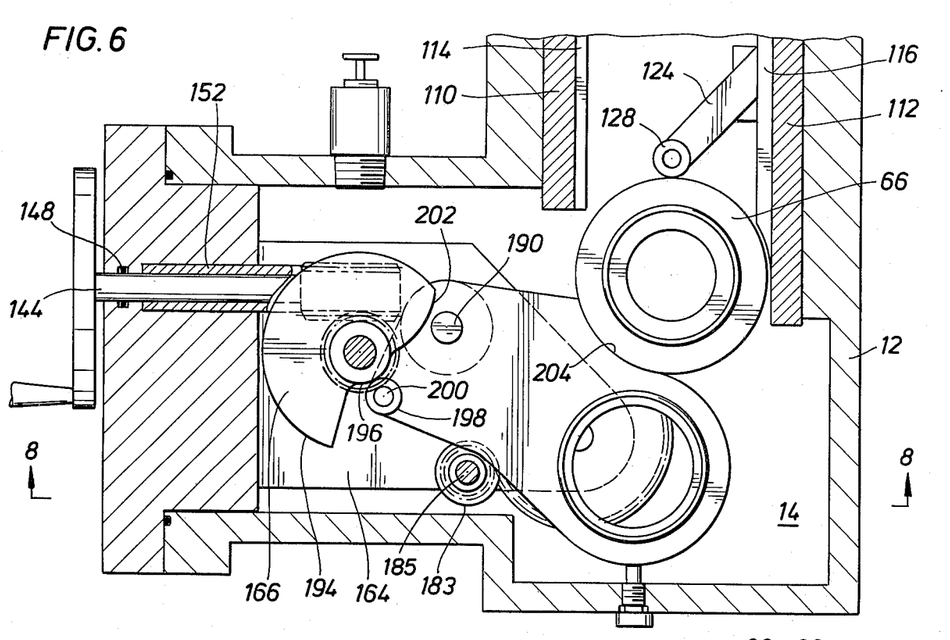
FIG. 6 is a partial vertical sectional view of the orifice plate mechanism illustrating the orifice plate ejector and the plate ejector cam in the retracted position of the orifice plate ejector and with an orifice plate in position within the orifice plate receptacle.
Figure 7:
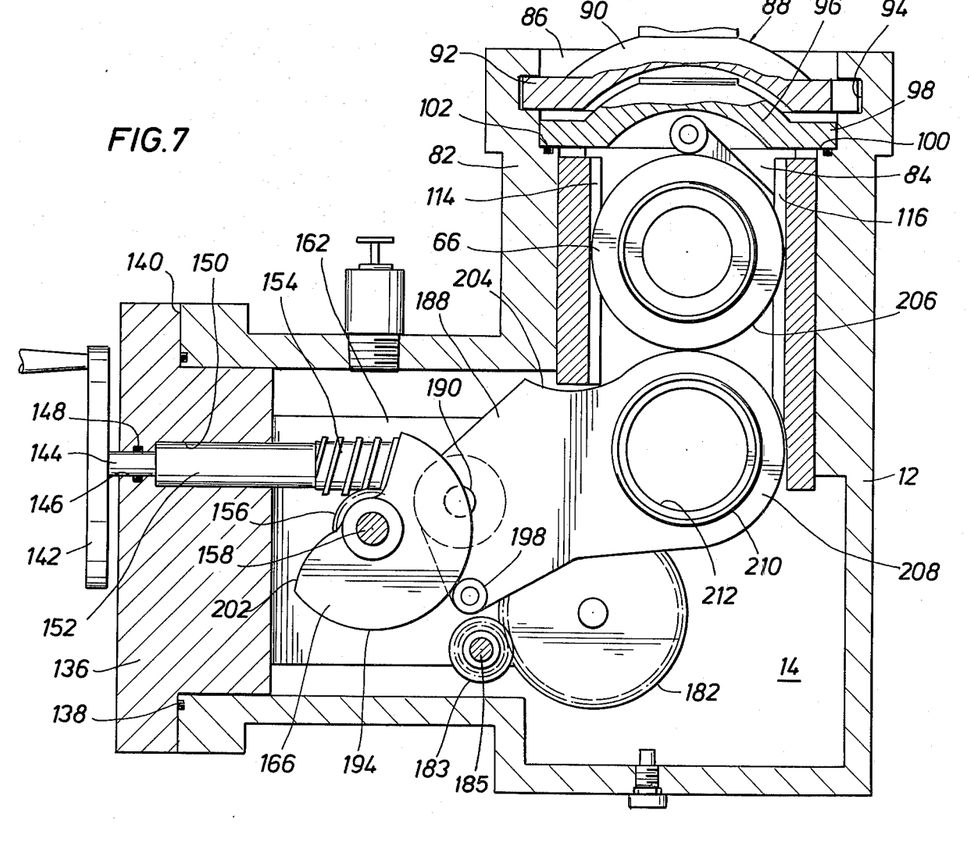
FIG. 7 is a sectional view similar to that of FIG. 6 and illustrating the orifice plate ejector and its operating cam in the plate ejecting position thereof.
Figure 8:
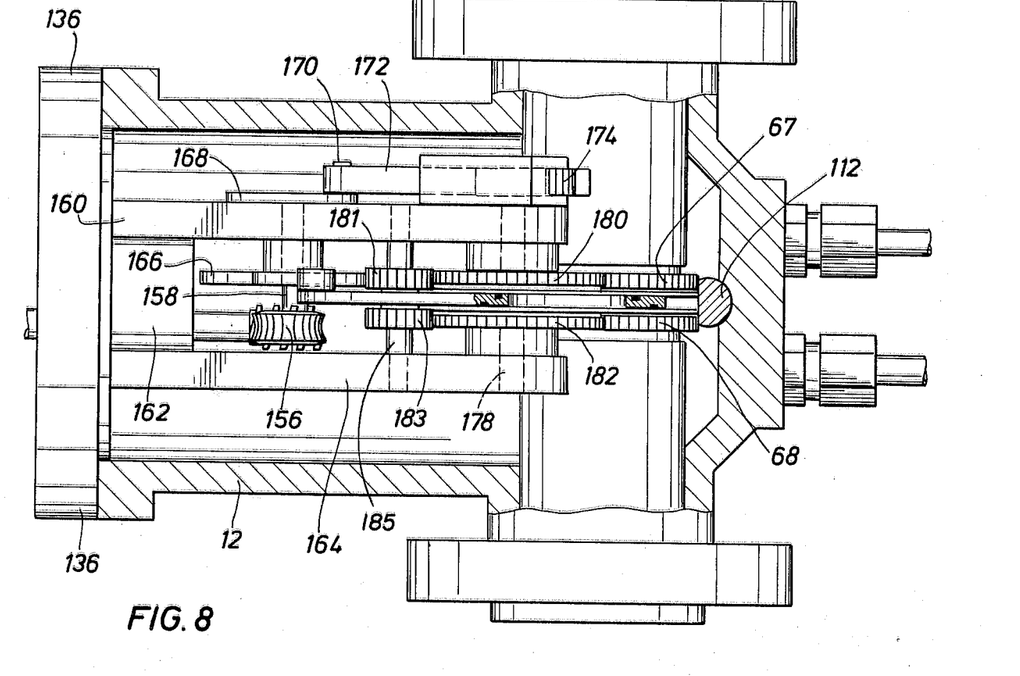
FIG. 8 is a sectional view taken along line 8—8 of FIG. 6 and particularly illustrating the gear train and crank mechanisms in detail.

Although the orifice plate member 66 will move downwardly by force of gravity, being guided by the guide grooves 114 and 116 during such movement, it is nevertheless appropriate to provide means for inducing such downward movement and to overcome any tendency of the orifice plate to stick and become lodged in the access passageway when such downward movement is intended. Accordingly, as shown in FIG. 9 and also in FIGS. 6 and 7, the access extension 82 is formed to define a receptacle 118 having an internal stop shoulder 120. A plate urging member 122 is received within the receptacle 118 with an enlarged annular portion thereof bearing against the shoulder 120. A spring urged lever arm 124 is connected in pivotal relation to the urging member 122 and includes a transverse arm 126 having a plate engaging roller member 128 provided at the free extremity thereof. The roller member is maintained in contact with the orifice plate 66 in the manner shown in FIGS. 6 and 7. With the orifice plate 66 in operative position in the plate receptacle as shown in FIG. 6, the spring induced lever 124 is pivoted to a downwardly inclined position with the roller member 128 in contact with the upper portion of the orifice plate. During downward movement of the orifice plate to the position shown in FIG. 6, a spring force is continually induced through the lever arm 24 and roller 128 to the orifice plate. This force is sufficient to overcome any tendency of the orifice plate to stick and lodge within the access passageway. As shown in FIG. 7, lever arm 124 has been moved to its uppermost position, establishing an upwardly inclined relation as compared to the position shown in FIG. 6. Again, the roller 128 maintains its forcible contact with the upper portion of the orifice plate during movement between the positions shown in FIGS. 6 and 7.

It is desirable to provide means for inducing movement of the orifice plate from the position shown in FIG. 6 to the position shown in FIG. 7. In sequential relation with such movement, it is necessary that the seat members 50 and 52 first release sealing engagement with the orifice plate to prevent such movement and that sealing again be established between the seat members and a suitable structure so as to seal the flow passage 38 from the body chamber 14. It is also desirable that such plate movement controlling activities and sealing activities be induced in sequential and concerted relation by means of simplified actuator means. Accordingly, as shown in FIGS. 5, 6, 7 and 8, an actuator mechanism is illustrated which accomplishes these features. The valve body structure 12 is further formed to define an actuator extension 130 which extends in substantially normal relation with the access passageway 84 as shown in the drawings. At the free extremity of the actuator extension is provided a circular support flange 132 having a plurality of internally threaded openings formed therein and adapted to receive bolts 134 which secure a closure member 136 in sealed relation therewith. A sealing element 138 is provided at the sealing face 140 for establishment of a fluid seal between the closure member and the flange portion 132 of the actuator extension. As shown in FIGS. 6 and 7, an actuator hand wheel is provided as shown at 142 and which is secured to the outer extremity of an actuator shaft 144 that extends in sealed relation through an aperture 146 defining the closure member 136. The actuator shaft is sealed by means of an annular sealing element 148. The closure member 136 is further to define an enlarged bushing receptacle 150 within which is located an elongated bushing member 152 which provides bearing support for the shaft 148. The bushing member 152 also provides thrust support for a worm gear member 154 which is secured to the extremity of the shaft 144. The worm gear 154 is in driving relation with a cam and crank actuating gear 156 having a gear shaft 158. The gear shaft 158 is journalled for rotation by means of a support frame member 160 which is secured by bolts to a support projection 162 that forms a central portion of the closure member 136. Another support plate 164, which is substantially identical with support plate 160, is also secured by bolting and/or pinning to the support projection 162. The support plates 160 and 164 provide structural support for the gear train mechanism and cam mechanism of the actuator. A cam element 166 and a crank element 168 are secured in nonrotatable relation to the gear shaft 158. A crank arm 170 extends from the crank element 168 in offset relation to the shaft 158 and provides driving connection with a crank shaft 172 translating the rotary motion of the crank element 170 to a linear reciprocating motion. The crank shaft 172 is also a rack element having rack gear teeth 174 formed thereon for engagement with the teeth of a spur gear 176. The spur gear 176 is fixed to a shaft 178 that is journaled for rotation in the frame member 160 and the gear positioning boss through which it extends. A large spur gear 180 is also fixed to the shaft 178 and is rotatable along with. Gear 180 is in driving relation with the gear 67 teeth of the seat element 50. It is desirable that a gear train system impart simultaneous driving rotation to the seat elements 50 and 52 and that the orifice plate ejector be capable of passing between the seat elements during its ejection movement. This feature is accomplished by providing a straddle gear system defining a space through which the orifice plate ejector moves. A pair of straddle gears 181 and 183 are mounted in non-rotatable relation on a shaft 185 having its ends rotatably supported in journals definings by the support elements 160 and 164. The gears 181 and 183 represent straddle gears which transfer forces to the rotatable seat members. Straddle gear 183 is in driving relation with a large spur gear 182 supported by a shaft 178 extending in rotatable-relation through a journal defined by support member 164. The gear 182 is in driving relation with the gear teeth 68 of seat element 52.

The gear pairs 67-180 and 68-182 are spaced, defining a space through which the orifice plate ejector is permitted to move as it pivots between the ejecting and retracted positions thereof.

The straddle gear train functions as follows: Rotatable crank element 168-170 imparts linear driving movement to the crank shaft 172 causing the rack gear teeth shaft 178 to which it is fixed. The shaft 178 induces simultaneous rotation of the large pinion gear 180 by virtue of its fixed relation with shaft 178. Gear 180 induces rotation to the seat element gear 167 and also rotates the straddle gear 181. The straddle gear 181 rotates its shaft 185 and the other straddle gear 183 which is also fized to the shaft 185. Gear 185 in turn imparts driving rotation to the large spur gear which, through its geared relation with seat element gear 68 imparts rotation to the seat element 52.

Upon simultaneous rotation of the straddle gears 180 and 182, the geared relation thereof with the gear teeth of the seat members induces simultaneous rotation of the seat members 58 and 60 in a common direction. By virtue of the right and left hand threads thereof, as described above in connection with FIG. 4, the seat members are driven toward one another or away from one another depending upon the direction of rotation. The rack member or crank shaft 172 extends through a guide passage 184 formed in a guide block 186 that is pivotally supported by the support plate member 160. The guide passage 184 functions to maintain the teeth of the rack and the spur gear in optimum driving relation during linear movement of the rack member. The pivotal relation of the guide block 186 to the support plate 160 functions to permit angular changes of the rack or crank shaft as the crank element 170 is rotated. As the crank element 170 is rotated by the crank plate 168 upon rotation of the shaft 158, the rack member 172 is reciprocated in linear manner. This linear movement of the rack element is translated by the pinion gear into rotation of the gear train that induces the seat members to move toward one another or away from one another. The seat members are therefore movable responsive to selective rotation of the actuator shaft by means of the actuator handle.

As shown in FIGS. 6 and 7, and ejector plate 188 is pivotally supported by a central portion 190 of the straddle gear support shaft 185. The ejector plate 188 is pivotal about the support shaft pivot 190 from a retracted, downwardly inclined position, as shown in FIG. 6 to an ejecting, upwardly inclined position as shown in FIG. 7. As shown in FIGS. 6 and 7, the cam element 166 defines a large concentric surface portion 194 and a small concentric surface portion 196. The ejector member incorporates a cam roller 198 which is rotatably secured by a roller support member 200 extending from the ejector plate. When the cam roller 198 is in contact with either of the large or small concentric surface portions 194 or 196, the ejector plate member 188 will be maintained in the positions thereof shown in FIGS. 6 and 7 even though cam rotation may be taking place. The cam member also defines a lifting cam surface portion 202 which engages the cam roller 198 and induces rotational movement of the ejector member 188 about the pivot 190. When this occurs, the ejector plate will pivot from the downwardly inclined retracted position thereof shown in FIG. 6 toward the upwardly inclined ejecting position shown in FIG. 7. This counterclockwise pivoting movement of the ejector plate as shown in FIGS. 6 and 7 will induce movement of the orifice plate 66 from the operative position thereof shown in FIG. 6 to the ejected position shown in FIG. 7. Obviously, ejecting movement of the orifice plate can take place only after the seat members 50 and 52 have been retracted from sealing engagement therewith. The large and small concentric surfaces 194 and 196 of the cam maintain static positioning of the ejector plate 188 during opening and closing movement of the seat elements which is simultaneously induced by the crank member and straddle gear train.

It is pointed out that rotation of the cam member 166 with the cam roller 198 in engagement with either of the large or small concentric surface portions will allow the seat members to be moved to the sealed or unsealed positions thereof by continued rotation of the shaft 158 by means of the worm gear 154 and its associated gear 156.

In order to permit downward rotation of the ejector plate 188 from the position shown in FIG. 7 to the position shown in FIG. 6, the direction of rotation of the hand wheel 142 is reversed, thereby reversing the drive mechanism actuating the seat members and the cam member. Initial rotation of the cam member 166 as shown in FIG. 7 will cause the ejector plate to be maintained at its upwardly inclined position as shown and permitting retraction of the seat members 150 and 152 from the position shown in FIG. 3 to the position shown in FIG. 4. Upon retraction of the seat members, the cam member 166 will have rotated counterclockwise as shown in FIG. 7, thus bringing the cam roller to the point of intersection of cam surface 202 and the large concentric cam surface 194. Further rotation of the cam member 166 in a counterclockwise direction will allow the cam roller freedom of movement in a counterclockwise arcuate direction about the pivot shaft portion 190. Since the ejector plate 188 is pivoted at one extremity thereof, its weight induces a force moment about the pivot shaft portion 190 causing it to fall by its own weight from the FIG. 7 position to the position shown in FIG. 6. This falling pivotal movement will cause the cam roller 198 to move into contact with the small concentric surface 196.

Downward movement of the ejector plate from the position of FIG. 7 toward the FIG. 6 position is further induced by the force developed by the lever arm and roller 124-128 bearing against the upper portion of the orifice plate 66. The orifice plate in turn bears against the upper portion of the ejector plate, transmitting the downwardly directed force of the spring induced lever 124 thereto. The ejector plate 188 also functions to position the orifice plate 66 relative to the flow passages and seat elements. The ejector plate defines a plate positioning edge 204 of arcuate configuration having substantially the same curvature as the circular curvature of the outer periphery 206 of the orifice plate. When the ejector plate 188 descends to the position shown in FIG. 6, the curved positioning surface 204 will be positioned for contact by the orifice plate. When the ejector plate is properly positioned, the locator surface 204 will be positioned such that when contacted by the orifice plate, the orifice plate will be properly located relative to the orifice plate receptacle and movable seat members.

The ejector plate 188 is formed to define a sealing portion 208 having sealing members 210 located on each side thereof. The sealing portion of the orifice plate also defines a circular port 212 which is adapted for registry with the flow passage 38 and presents an unrestricted bore through which pigs, scrapers, and other such devices may pass. When the ejector plate moves to the ejecting position as shown in FIG. 7, the sealing portion 208 thereof will move into the orifice plate receptacle between the extremities 38 and 40 of the tubular conduit members 34 and 36. The sealing elements of the orifice plate will consequently be positioned between the sealing faces of the movable seat members 50 and 52. Thereafter, the seat members are simply shifted to the closed or the sealed positions thereof in sealing engagement with the sealing portion of the ejector plate. After a proper seal has been established between the seat members and the ejector plate, the pressurized flow passage 38 and the body chamber 14 will be separated. Thereafter, the body chamber may be depressurized while the flow passage 38 remains pressurized. Depressurization of the body chamber is accomplished by opening a vent valve 214 which is in communication with a passage 216 that intersects the access passageway 84.

OPERATION

Figure 5:
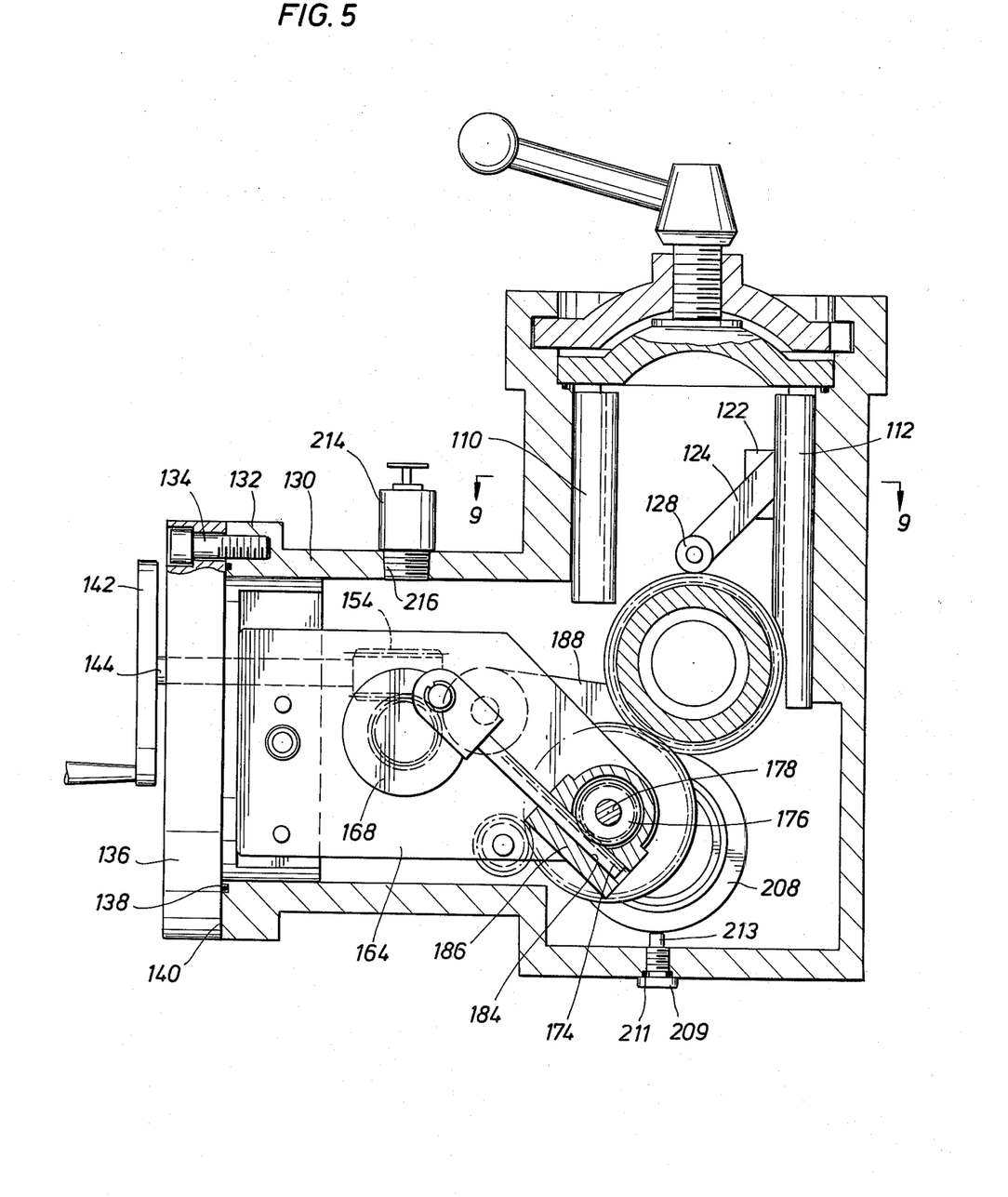
FIG. 5 is a sectional view taken along line 5—5 of FIG. 1 and being a vertical section showing an orifice plate in operative position within the orifice plate receptacle between the seat members.

With the orifice fitting mechanism in the condition shown in FIGS. 5 and 6, the movable seat members 50 and 52 will be in the positions shown in FIG. 3 establishing sealing engagement with the orifice plate 66. Assuming that it is desirable to shift the orifice plate from its operative position between the seat members to the ejected position of FIG. 7, operating personnel will simply rotate the hand wheel 142 in the appropriate direction thereby driving the actuator shaft 144 and the worm gear 154. Rotation of the worm gear causes rotation of the gear 156 thereby driving the shaft 158 supporting the crank plate 168 and the cam member 166. With the crank and cam rotating simultaneously, the crank shaft or rack 172 with rack teeth 174 will be moving linearly by virtue of the crank thereby imparting rotation to the pinion gear 176 associated therewith. Rotation of the pinion gear causes consequent rotation of the straddle gears 180 and 182 and the straddle pinion gears 181 and 183. Rotation of the straddle gears 180 and 182 induces rotation to the seat elements 50 and 52 by virtue of the geared connection between the straddle gears and the gear teeth 67 and 68 of the seat elements. The seat elements thus rotate and by virtue of the threaded engagement thereof with the externally threaded portions 54 and 56 of the conduit members are retracted out of sealing engagement with the sealing element 60 and 62 of the orifice plate 66. Continued rotation of the actuator shaft thus moves the seat members to the retracted positions thereof.

As the actuator shaft is rotated to impart retraction movement to the seat members, the cam member 166 will also be rotated. Since the cam roller 198 is in contact with the small concentric cam surface 196, no resultant force will be developed against the cam roller and thus the orifice plate 188 will remain in the retracted position shown in FIG. 6. After the seat members 50 and 52 have almost reached the retracted positions thereof, the cam member 166 will have been rotated sufficiently to bring the lifting cam surface 202 into driving contact with the cam roller 198. Continued rotation of the cam member will then cause cam surface 202 to induce a force to the cam roller 198, thus causing pivotal rotation of the ejector plate from the position shown in FIG. 6 toward the position shown in FIG. 7. During this pivotal movement, the ejector plate forces the orifice plate 66 from its FIG. 6 position upwardly through the guide slots 114 and 116 into the access passageway 84. To accomplish this movement the ejector plate 188 must induce sufficient force to the orifice plate to overcome the downward force of the spring biased lever 124. This spring biased force is relatively small, however, and thus shifting movement of the orifice plate is accomplished quite easily. Continued rotation of the cam member 166 will cause continuing rotation of the ejector plate 188 about its pivot 190 until the cam roller has moved outwardly sufficiently to come into contact with the outer concentric cam surface 194. After this has occurred, the sealing portion 208 of the orifice plate will be positioned in the orifice plate receptacle in sealing position between the seat members 50 and 52. The ejector plate will have moved the orifice plate 66 to the position shown in FIG. 7. At this point, the seat members 50 and 52 will be retracted. Continued rotation of the cam member 166 with the cam roller in engagement with the cam surface 194 will not result in further pivotal movement of the ejector plate. The crank member, however, will be continuously rotating along with the cam member 166 and, at this point, will be moving the crank shaft or rack 172 in the opposite linear direction, thereby causing the rack teeth 174 to rotate the pinion gear 176 in the opposite direction. This opposite rotation of the pinion gear 176 induces reverse rotation of the straddle gears and thus also induces reverse rotation of the seat elements 50 and 52 by virtue of geared connection therewith. The seat elements are thence driven into sealing engagement with the sealing portion of the ejector plate thereby establishing a positive seal between the flow passage 38 and the body chamber 14.

After sealing engagement with the ejector plate has been established, bleed valve 214 may be opened thereby depressurizing the body chamber 14. With the body chamber depressurized, the quick disconnect type closure assembly 88 may be manipulated in such a manner as to break its seal at the access opening and thus permit it to be quickly removed. The lever arm 124 is thence pivoted to bring the roller 128 thereof out of contact with the orifice plate 166. The orifice plate may then be simply removed from the access passageway and a new orifice plate may be inserted. The lever arm is then released, allowing its spring force to rotate it sufficiently to bring the roller 128 thereof into contact with the replaced orifice plate. The quick disconnect closure is then reassembled with the body structure 12 to seal the access opening 86 in the manner discussed above. After this has been done, the hand wheel 142 of the actuator mechanism is simply rotated in the reverse direction inducing reverse rotation to the worm gear 154 and its associated gear 156, together with the shaft 158, the crank element 168 and the cam member 166. The cam member, however, will be in the FIG. 7 position thereof and will not permit downward pivoting rotation of the ejector plate 188 by virtue of contact between the outer concentric cam surface 194 and the cam roller 198. The crank element, however, will move the crank shaft or rack 172 linearly causing the rack teeth 174 to induce rotation to the pinion gear and the straddle gears 181 and 183 and the large pinion gears 180 and 182 of the straddle gear train. This causes rotation of the seat members 50 and 52 in the manner described above thereby shifting the seat members toward the retracted positions thereof. This rotational movement of the actuator shaft will continue until the seat members have been sufficiently retracted to allow retraction of the ejector plate and insertion of the replacement orifice plate. At this point, the cam member will have rotated sufficiently that the cam roller 198 will descend over the cam surface 202 to the small diameter concentric cam surface 196. During this pivotal movement the ejector plate will have pivoted downwardly to the position shown in FIG. 6. Continued rotation of the actuator shaft will, through the rack and pinion drive mechanism for the straddle gear train, induce closing rotation to the gears 167 and 168 of the seat members thus moving the seat members into sealing contact with replacement orifice plate. It should be noted that during downward movement of the ejector plate from the position of FIG. 7 to the position shown in FIG. 6, the lever arm 124 will continuously induce a downward force on the replacement orifice plate, assisting it in downward movement into the orifice plate receptacle between the seat members. When the ejector plate is fully retracted, the positioning surface 204 thereof will be located such that it supports the replacement orifice plate in proper position between the seat members 50 and 52.

In view of the foregoing, it is clear that upon unidirectional rotation of an actuator shaft, the orifice plate mechanism will first accomplish seat retraction to release its sealing engagement with an orifice plate positioned between the seats and will then accomplish ejection of the orifice plate from an orifice plate receptacle to an access passageway. After this has been accomplished, continued rotation of the actuator shaft in the same direction will induce closing movement of the seat members to establish sealing engagement with the sealing portion of an ejector plate that has moved into the orifice plate receptacle and displaced the orifice plate therefrom. The body chamber of the orifice fitting is then depressurized, allowing the flow passages to remain pressurized. The orifice plate is simply removed for inspection or replacement by virtue of a quick disconnect closure assembly for the access opening of the access passage. The orifice plate is positively guided during linear insertion or ejection movement by guide channels receiving the peripheral portions thereof to ensure that the orifice plate moves positively into properly received relation within an orifice plate receptacle during insertion movement. Insertion movement and ejection movement of the orifice plate is therefore accomplished simply by controlled rotation of the actuator hand wheel in a selected direction. Insertion and ejection movement is therefore of simple nature and can be efficiently accomplished with a minimum of time and effort.

It is therefore seen that this invention is one well adapted to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. An orifice fitting mechanism comprising:
   (a) a body structure defining flow passage means and adapted for connection into a conduit system, said body structure defining an internal chamber and having an access opening through which an orifice plate is introduced into said internal chamber and removed therefrom, said body structure further defining a plate receptacle opening communicating said internal chamber with said flow passage means;
   (b) an orifice plate being movably positioned within said chamber and being movable between an operative position wherein said orifice plate is positioned within said orifice plate receptacle and an inoperative position where said orifice plate is removed from said orifice plate receptacle;
   (c) orifice plate ejector means being disposed within said internal chamber and having a sealing plate portion and an ejector portion, said ejector means being movable from a retracted position permitting said orifice plate means to be positioned within said orifice plate receptacle and an ejecting position where said sealing plate portion is moved into said orifice plate receptacle and displaces said orifice plate from said operative position to said inoperative position;

(d) seat means for selectively sealing said orifice plate and said sealing plate portion relative to said body structure at said orifice plate receptacle, said sealing means being retractable to a position allowing movement of said orifice plate and sealing plate structure relative to said orifice plate receptacle; and (e) seat drive means for imparting controlling movement to said seat means in coordinated relation with movement of said orifice plate ejector means.

2. An orifice fitting as recited in claim 1, wherein said body structure further defines:

(a) access opening means of sufficient size to permit introduction and removal of said orifice plate from said internal chamber; and (b) removable closure means for said access opening means.

3. An orifice fitting as recited in claim 2, wherein said body structure further defines:

(a) an internal chamber access passage within which said orifice plate is positioned at said inoperative position thereof; and (b) guide means maintaining proper orientation of said orifice plate relative to said orifice plate receptacle during movement of said orifice plate between said operative and inoperative positions thereof.

4. An orifice fitting as recited in claim 3, wherein said guide means comprise:

a pair of opposed parallel guide slots being defined within said internal chamber access passage and receiving opposed edges of said orifice plate in guiding relation therein.

5. An orifice fitting as recited in claim 4, wherein:

(a) opposed partial bores are defined in parallel relation by said body structure, said partial bore opening into said internal chamber along the length thereof;

(b) a pair of guide bars being received within said partial bores, said guide bars each defining one of said elongated guide slots and are oriented such that said guide slots are exposed within said internal chamber; and (c) means securing said guide bars in immovable relation to said body structure.

6. An orifice fitting mechanism as recited in claim 1, including:

urging means continuously acting on said orifice plate and urging said orifice plate toward said orifice plate receptacle, upon movement of said sealing plate to said retracted position said urging means moving said orifice plate into said orifice plate receptacle.

7. An orifice fitting as recited in claim 1, wherein:

(a) said orifice plate and said sealing plate portion each define sealing means on each side thereof; and (b) said slot means establishes sealing engagement with said sealing means at said operative position of said orifice plate and said ejecting position of said orifice plate ejector means.

8. An orifice fitting as recited in claim 7, wherein:

(a) said body structure defines opposed thread means about said orifice plate receptacle;

(b) said seat means being a pair of seat element threadedly received by respective ones of said opposed thread means and being simultaneously rotated by said seat drive means.

9. An orifice fitting as recited in claim 8, wherein:

said opposed thread means are right hand and left hand threads respectively receiving said seat elements, upon being simultaneously rotated in the same direction, said seat element being selectively driven toward or away from one another.

10. An orifice fitting as recited in claim 1, wherein:

said means imparting controlling movement to said seat means and said orifice plate ejector means are each driven by common drive means.

11. An orifice fitting as recited in claim 1, wherein said orifice plate ejector means comprises:

(a) means mounting said sealing plate portion for pivotal movement within said internal chamber;

(b) cam means being pivotally mounted within said chamber and having camming engagement with said sealing plate portion and being operative upon rotation thereof to impart rotational ejecting movement to said sealing plate portion from said retracted position to said ejecting position; and (c) actuator means extending through said body structure and having controlling engagement with said cam means, said actuator means being movable to impart rotational movement to said cam means.

12. An orifice fitting as recited in claim 11, wherein:

(a) gear means imparts controlling movement to said seat means; and (b) said cam means and said gear means are driven simultaneously by said actuator means.

13. An orifice fitting as recited in claim 11, wherein:

(a) crank means is movably positioned within said body structure and is rotated along with said cam means by said actuator means; and (b) means translating linear motion of said crank means into rotary motion of said seat means for selective sealing or retracting movement thereof.

14. An orifice fitting as recited in claim 13, wherein said translating means comprises:

(a) crank shaft means being driven by said crank means;

(b) elongated connecting means being connected to said crank means and being reciprocated by said crank means;

(c) rack gear teeth being defined by said elongated connecting means; and (d) a gear train incorporating pinion gear means being driven by said rack gear teeth, said gear train having driving relation with said seat means and simultaneously rotating said seat means in a common direction of rotation.

15. An orifice fitting as recited in claim 14, wherein said gear train comprises:

straddle gear means for rotating said seat means.

16. An orifice fitting as recited in claim 14, wherein:

(a) said seat means comprises a pair of seat elements each having threaded connection to said body structure and having gear teeth formed thereon; and (b) said gear train has driving relation with said gear teeth of said seat elements.

17. An orifice fitting as recited in claim 1, wherein:

(a) said body structure includes a pair of internal conduits positioned in opposed, spaced relation and defining said orifice plate receptacle therebetween, said internal conduits defining at least a portion of said flow passage means and having thread means formed thereon;

(b) said seat means being a pair of threaded seat rings having threaded connection to respective ones of said internal conduits; and (c) said seat drive means, upon being actuated, imparting common unidirectional rotation of said seat rings in one direction to cause said seat rings to be moved toward one another and in the opposite direction to cause said seat rings to move away from one another.

18. An orifice fitting as recited in claim 17, wherein said seat rings include:

seal means maintaining sealing relation between said seat rings and respective ones of said internal conduits.

19. An orifice fitting as recited in claim 1, wherein:

(a) crank induced drive means imparts selective sealing and retracting movement to said seat means relative selectively to said orifice plate and said ejector means;

(b) cam induced drive means imparts injecting movement to said plate ejector means and permits retraction movement of said plate ejector means; and (c) said crank induced drive means and cam induced drive means being simultaneously actuated and being cooperatively related to accomplish controlled sequential movement of said seat means, plate ejector means and orifice plate during insertion and ejection of said orifice plate.

20. An orifice fitting as recited in claim 19, wherein: said crank induced drive means and cam induced drive means are simultaneously energized by a common actuator.

21. An orifice fitting as recited in claim 1, wherein: said plate ejector defines positioning means for accurately positioning said orifice plate within said orifice plate receptacle.

22. An orifice fitting as recited in claim 1, wherein:

(a) said body structure defines a tubular actuator extension defining an actuator access passage having an external opening;

(b) actuator support means forms a removable closure for said external opening; and (c) said orifice plate ejector means and said seat drive means being supported by said actuator support means and being assembled to said body structure and removed from said body structure in unitary form by separating said actuator support means from said body structure.

23. An orifice fitting as recited in claim 1, wherein:

(a) said seat means comprises a pair of seat elements being positioned in parallel relation for rotation about a common axis, one of said seat elements having right hand threaded connection to said body structure and the other of said seat elements having left hand threaded connection to said body structure, said seat element each defining circular arranged gear teeth;

(b) said seat drive means includes:

(1) a pair of seat drive gears having driving relation with the gear teeth of respective ones of said seat elements, said spaced gears being indppendently supported for rotation and sufficiently spaced to permit movement of said orifice plate ejector means therebetween, (2) a pair of straddle gears fixed to a common shaft which is rotatably supported by said body structure, said straddle gears engaging respective ones of said seat drive gears, (3) a seat drive shaft providing nonrotatable support for one of said seat drive gears and being the force input shaft for operation of said gear train, and (4) means for imparting driving rotation to said seat drive shaft.

24. An orifice fitting as recited in claim 23, wherein:

(a) a single rotatable operating shaft extends in sealed relation through said body structure;

(b) operator gear means being connected to said operator shaft;

(c) crank means being connected in driven relation with said operator gear means; and (d) rack and pinion gear means being driven by said crank means, said pinion gear being fixed to said seat drive shaft.

25. An orifice fitting mechanism comprising:

(a) a body structure defining inlet and outlet openings and having internal tubular elements extending from said inlet and outlet openings and defining a straight through flow passage, said tubular elements being positioned in aligned registering spaced relation and defining an orifice plate receptacle therebetween, said body structure defining a body chamber externally of said tubular elements and forming access opening means through which an orifice plate is introduced into said orifice fitting mechanism and removed therefrom;

(b) a pair of seat elements being positioned within said body chamber, one of said seat members having right hand threaded connection with one of said tubular members, the other of said seat members having left hand threaded connection to the other of said tubular members, rotation of said seat members in one common direction causing said seat members to be driven toward one another and rotation of said seat members in the opposite common direction causing said seat members to be driven away from one another;

(c) orifice plate ejector means disposed within said body chamber and having a sealing portion engageable by said seat elements to seal said body chamber from said flow passage, said orifice plate ejector means being movable between a retracted position permitting an orifice plate to be positioned within said orifice plate receptacle between said seat elements and an ejecting position where said ejector means is positioned in said orifice plate receptacle and displaces the orifice plate from said orifice plate receptacle toward said access opening means; and (d) operator means for inducing sequential operation of said seat elements and orifice plate ejector means according to a sequence comprising:

(1) movement of said seat elements away from one another to release sealing engagement thereof from an orifice plate, (2) movement of said orifice plate ejector means into said orifice plate receptacle, displacing said orifice plate from said orifice plate receptacle;

(3) movement of said seat elements toward one another into sealing engagement with said orifice plate ejector means to seal said body chamber from said flow passage, (4) replacement of said orifice plate following depressurization and opening of said body chamber followed by closing of said body chamber;

(5) movement of said seat elements away from one another to release sealing engagement thereof with said orifice plate ejector means;

(6) movement of said orifice plate ejector means from said orifice plate receptacle to the retracted position thereof and simultaneous positioning of said orifice plate within said orifice plate receptacle; and (7) movement of said seat elements toward one another into sealing engagement with said orifice plate.

26. An orifice fitting as recited in claim 25 wherein said orifice plate ejector means includes a sealing plate portion and comprises:

(a) means mounting said sealing plate portion for pivotal movement within said internal chamber;

(b) cam means being pivotally mounted within said chamber and having camming engagement with said sealing plate portion and being operative upon rotation thereof to impart rotational ejecting movement to said sealing plate portion from said retracted position to said ejecting position; and (c) actuator means extending through said body structure and having controlling engagement with said cam means, said actuator means being movable to impart rotational movement to said cam means.

27. An orifice fitting as recited in claim 26, wherein:
(a) gear means imparts controlling movement to said seat means; and
(b) said cam means and said gear means are driven simultaneously by said actuator means.

28. An orifice fitting as recited in claim 26, wherein:
(a) crank means is movably positioned within said body structure and is rotated along with said cam means by said actuator means; and
(b) means translating linear motion of said crank means into rotary motion of said seat means for selective sealing or retracting movement thereof.

29. An orifice fitting as recited in claim 28, wherein:
(a) crank shaft means being driven by said crank means;
(b) elongated connecting means being connected to said crank means and being reciprocated by said crank means;
(c) rack gear teeth being defined by said elongated connecting means; and
(d) a gear train incorporating pinion gear means being driven by said rack gear teeth, said gear train having driving relation with said seat means and simultaneously rotating said seat means in a common direction of rotation.

30. An orifice fitting as recited in claim 25, wherein:
(a) crank induced drive means imparts selective sealing and retracting movement to said seat means relative selecting to said orifice plate and said ejector means;
(b) cam induced drive means imparts injecting movement to said plate ejector means and permits retraction movement of said plate ejector means; and
(c) said crank induced drive means and cam induced drive means being simultaneously actuated and being cooperatively related to accomplish controlled sequential movement of said seat means, plate ejector means and orifice plate during insertion and ejection of said orifice plate.

31. An orifice fitting as recited in claim 25, wherein:
(a) said seat means comprises a pair of seat elements being positioned in parallel relation for rotation about a common axis, one of said seat elements having right hand threaded connection to said body structure and the other of said seat elements having left hand threaded connection to said body structure, said seat element each defining circular arranged gear teeth;
(b) said seat drive means includes:
(1) a pair of seat drive gears having driving relation with the gear teeth of respective ones of said seat elements, said spaced gears being independently supported for rotation and sufficiently spaced to permit movement of said orifice plate ejector means therebetween,
(2) a pair of straddle gears fized to a common shaft which is rotatably supported by said body structure,
said straddle gears engaging respective ones of said seat drive gears,
(3) a seat drive shaft providing nonrotatable support for one of said seat drive gears and being the force input shaft for operation of said gear train, and
(4) means for imparting driving rotation to said seat drive shaft.

32. An orifice fitting as recited in claim 31, wherein:
(a) a single rotatable operating shaft extends in sealed relation through said body structure;
(b) operator gear means being connected to said operator shaft;
(c) crank means being connected in driven relation with said operator gear means; and
(d) rack and pinion gear means being driven by said crank means, said pinion gear being fixed to said seat drive shaft.

* * * * *